United States Patent [19]

Kirby

[11] Patent Number: 4,542,891

[45] Date of Patent: Sep. 24, 1985

[54] COMBINATION WORKBENCH, VENEER PRESS AND CASE GOODS ASSEMBLY PRESS

[76] Inventor: Ian J. Kirby, 55 Betty Dr., Cumming, Ga. 30130

[21] Appl. No.: 566,392

[22] Filed: Dec. 28, 1983

[51] Int. Cl.[4] .......... B23Q 3/00

[52] U.S. Cl. .......... 269/16; 269/221; 269/286; 269/287

[58] Field of Search .......... 156/583.3, 583.91, 580, 156/581, 323; 100/295, 93 P; 269/221, 286, 289 R, 303, 16, 246; 144/285, 286, 287

[56] References Cited

U.S. PATENT DOCUMENTS

| | | | |
|---|---|---|---|
| 249,568 | 11/1881 | Ale . | |
| 2,094,805 | 10/1937 | Meier . | |
| 2,627,289 | 2/1953 | Berthelsen | 100/93 P |
| 2,823,460 | 2/1958 | Weiler . | |
| 2,991,669 | 7/1961 | Stock . | |
| 3,030,879 | 4/1962 | Lasko | 100/295 |
| 3,158,526 | 11/1964 | Farnam et al. | 156/324 |
| 4,300,978 | 11/1981 | Whitemore et al. | 156/581 |

OTHER PUBLICATIONS

Ian J. Kirby, "The Torsion Box," *Fine Woodworking,* Jan.-Feb. 1982, pp. 96-102.

*Primary Examiner*—Robert C. Watson
*Attorney, Agent, or Firm*—John S. Pratt

[57] ABSTRACT

A combination woodworking bench and press for gluing veneered panels or assembling and gluing case good carcasses. A bench top of torsion box construction is supported by a trestle-type stand having rods or tubes for supporting movable pressing cauls and movable battens. Lower battens are supported on such rods during positioning in the press configuration, and work pieces are pressed between the bench top and movable cauls, which are also of torsion box structure. Pressure is applied by clamping the ends of pairs of battens positioned above and below the cauls and bench top.

7 Claims, 5 Drawing Figures

COMBINATION WORKBENCH, VENEER PRESS AND CASE GOODS ASSEMBLY PRESS

BACKGROUND OF THE INVENTION

This invention relates to woodworking benches, veneered panel gluing presses and case goods assembly and gluing presses.

Woodworking benches comprising generally a flat horizontal surface supported at waist height by legs or a base are well known in the prior art. Tops are most typically constructed, in better quality benches, of edge-to-edge laminations of dense hardwoods such as maple or beech. In addition to providing support for work pieces being machined with various tools, such bench tops are frequently used as clamping surfaces when work piece assemblies are clamped together during gluing. An attempt to use such a conventional bench top as one of two press members typically meets with limited success, however, because a solid or laminated wood top of conventional thickness on the order of $1\frac{1}{2}$ to 3 inches (38 to 76 millimeters) will bow significantly in response to application of clamping pressure at its edges. It is also difficult to maintain the top surface of such a solid wood structure uniformly flat because of wood movement in response to humidity changes.

Various veneering and case goods assembly and gluing presses are well known in the prior woodworking equipment art, typically comprising a massive steel bed, above which screws are mounted to exert pressure against systems of cauls and battens. Even larger structures are also known comprising opposing massive steel press plates or platens forced together by pneumatic rams. All such conventional presses are typically large, heavy, and expensive, thus placing equipment suitable for use in accurate veneering work and case goods assembly gluing beyond the means of small woodworking shop budget and space limitations.

SUMMARY OF THE INVENTION

The present invention comprises an inexpensive system of components usable as a high quality, stable woodworking bench having a durable bench surface which will remain flat within small tolerances despite seasonal or other humidity changes. The components may also be configured, in the same space, as a high accuracy press for gluing veneered panels or assembling and gluing case good carcasses, which press may be easily operated by a single woodworker.

The system comprises generally a trestle type stand, a bench top, two movable pressing cauls and movable battens. The stand or base comprises two leg members joined by a single trestle and veneer press component supports. The bench top serves as a workbench surface and, in the press configuration, as a lower press plate or caul. A means is provided for storing the upper press cauls and battens in the bench base when not in use. Such batten storage means also support lower battens in position for clamping during use of the system in the press configuration to facilitate convenient press operation by one worker. A conventional woodworking vice and a bench dog may be positioned on the bench top to avoid interference with press operation.

Each of the bench top, base legs and upper cauls are constructed as torsion boxes to achieve inexpensive, light-weight structures which are highly resistant to deformation in response to loading. The bench top and upper cauls are substantially identical in construction, differing primarily in length. They are a sandwich having outer torsion box skins of high density fiberboard, inner skins of medium density fiberboard and a central structure comprising ribs and edge members of medium density fiberboard which define spaces filled with honeycomb material.

Advantages of torsion box structures are described in my article "The Torsion Box" appearing in the January-February, 1982 issue of *Fine Woodworking* magazine published by the Taunton Press, Newton, Conn., which article is incorporated herein in its entirety by reference.

Accordingly, it is an object of the present invention to provide a relatively inexpensive combination woodworking bench, veneered panel gluing press and case goods carcass assembly and gluing press which may be easily utilized by a single worker to achieve highly accurate pressing operations.

It is a further object of the present invention to provide a stable woodworking bench having a durable surface to withstand normal wear and tear and remain flat to a high degree of accuracy despite extensive use and seasonal humidity variations.

It is an additional object of the present invention to provide a low cost, high accuracy veneered panel gluing press easily operated by an individual worker.

It is a further object of the present invention to provide a low cost, high accuracy case goods caracass assembly and gluing press, also easily operated by a single worker.

Further objects and advantages of the present invention will become apparent by reference to the description of the preferred embodiment depicted in the drawings and described below.

DETAILED DESCRIPTION OF THE DRAWINGS

Figure 1:
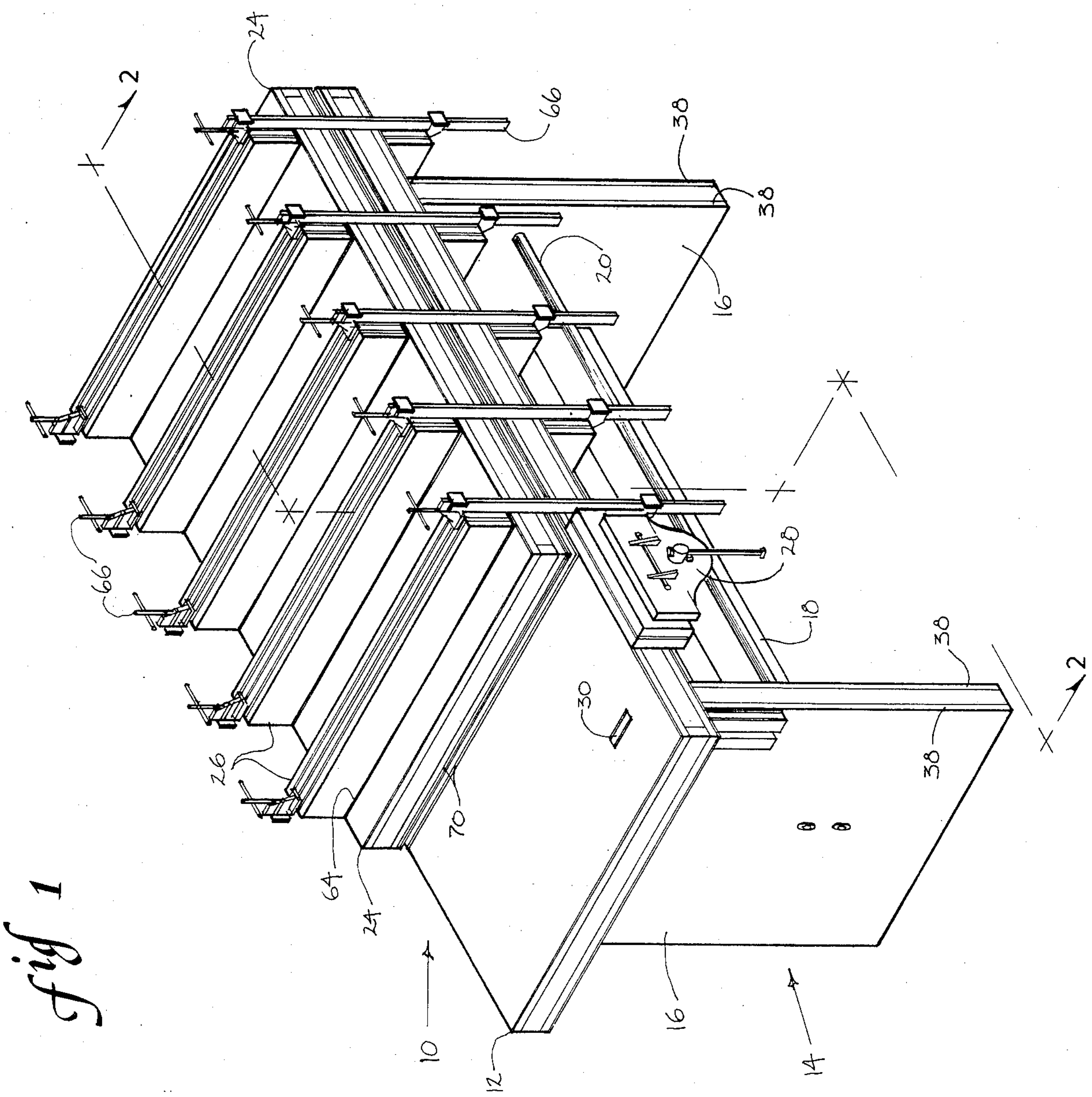
FIG. 1 is an isometric view of the combination workbench and gluing and assembly press of the present invention showing the components in use as a press.

The bench and press of the present invention comprises generally a bench 10, including bench top 12 and base 14, comprising base legs 16, stretcher 18, caul storage supports 20, and batten supports 22; and top cauls 24; battens 26; vice 28 and bench stop 30.

Base 14 is a conventional trestle structure. Legs 16 may be constructed of any suitable material, but a torsion box structure similar to the below-described bench top 12 and top caul 24 structure is utilized in the preferred embodiment to achieve a combination of economy, high strength and relatively low weight.

Figure 2:
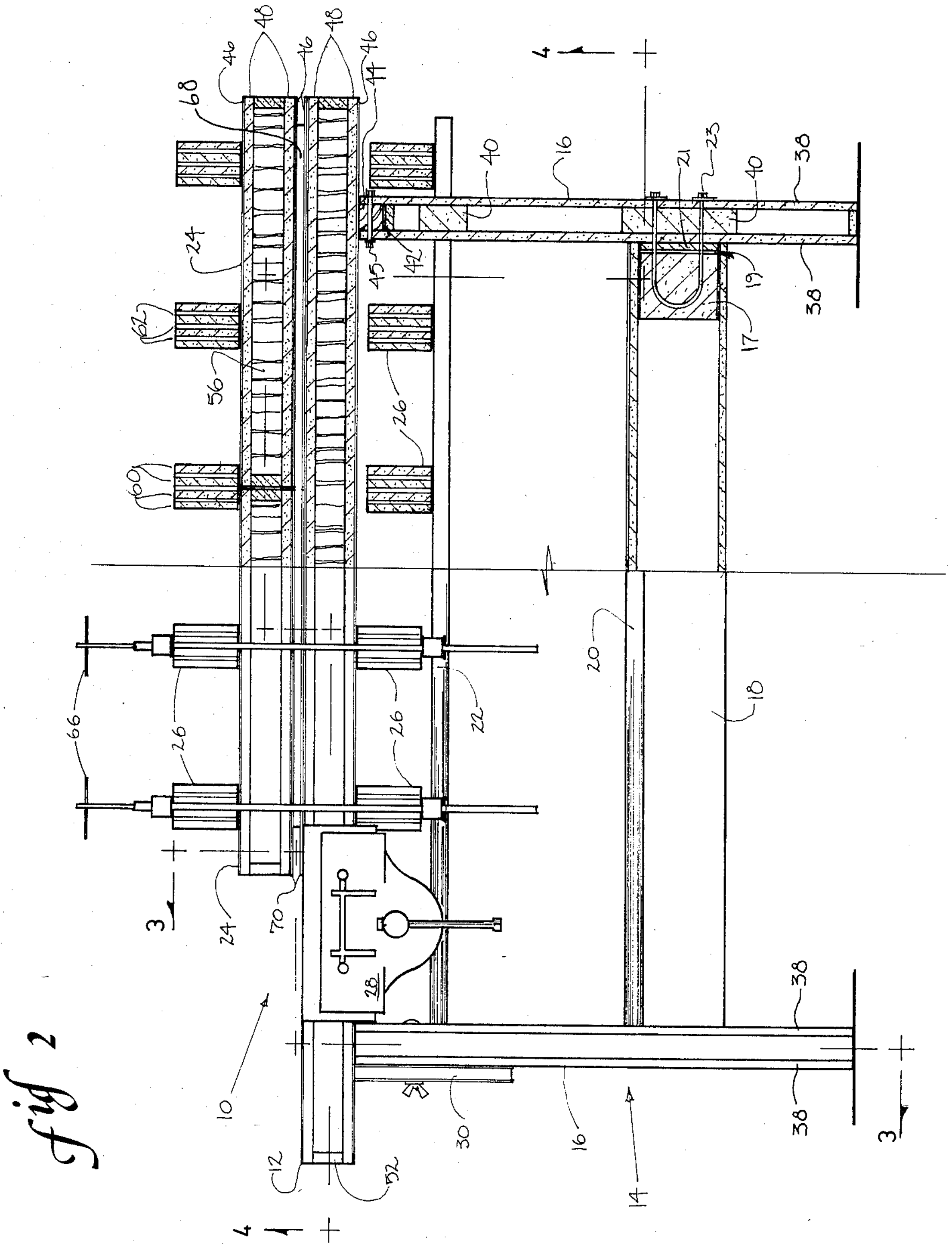
FIG. 2 is a front elevation view of the combination bench and press illustrated in FIG. 1, partially in section taken along Line 2—2 in FIG. 1.
Figure 3:
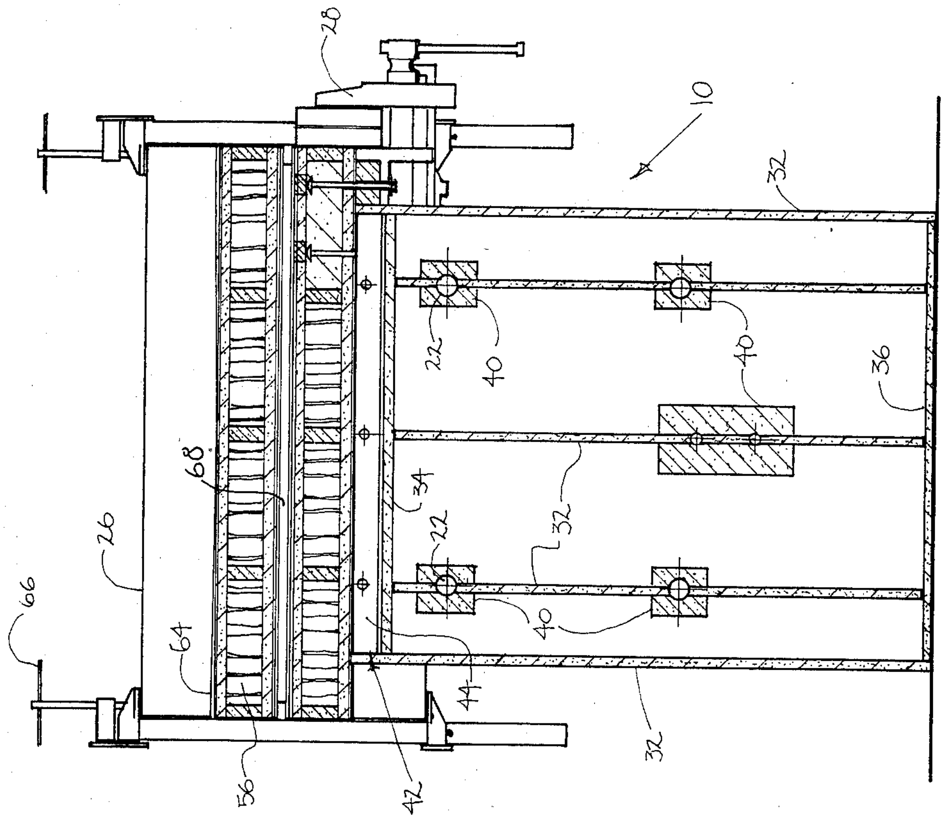
FIG. 3 is a side elevation view of the bench and press of the present invention taken along Line 3—3 in FIG. 2.
Figure 5:
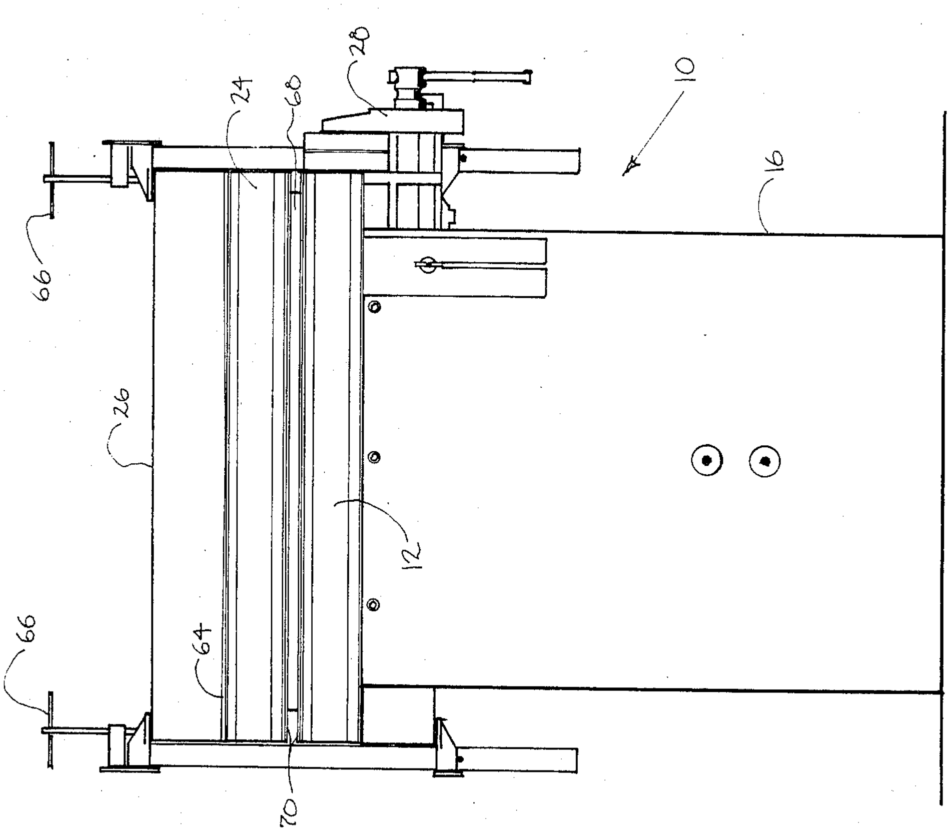
FIG. 5 is a side elevation view of the bench and press of the present invention similar to FIG. 3 but not in section.
Figure 4:
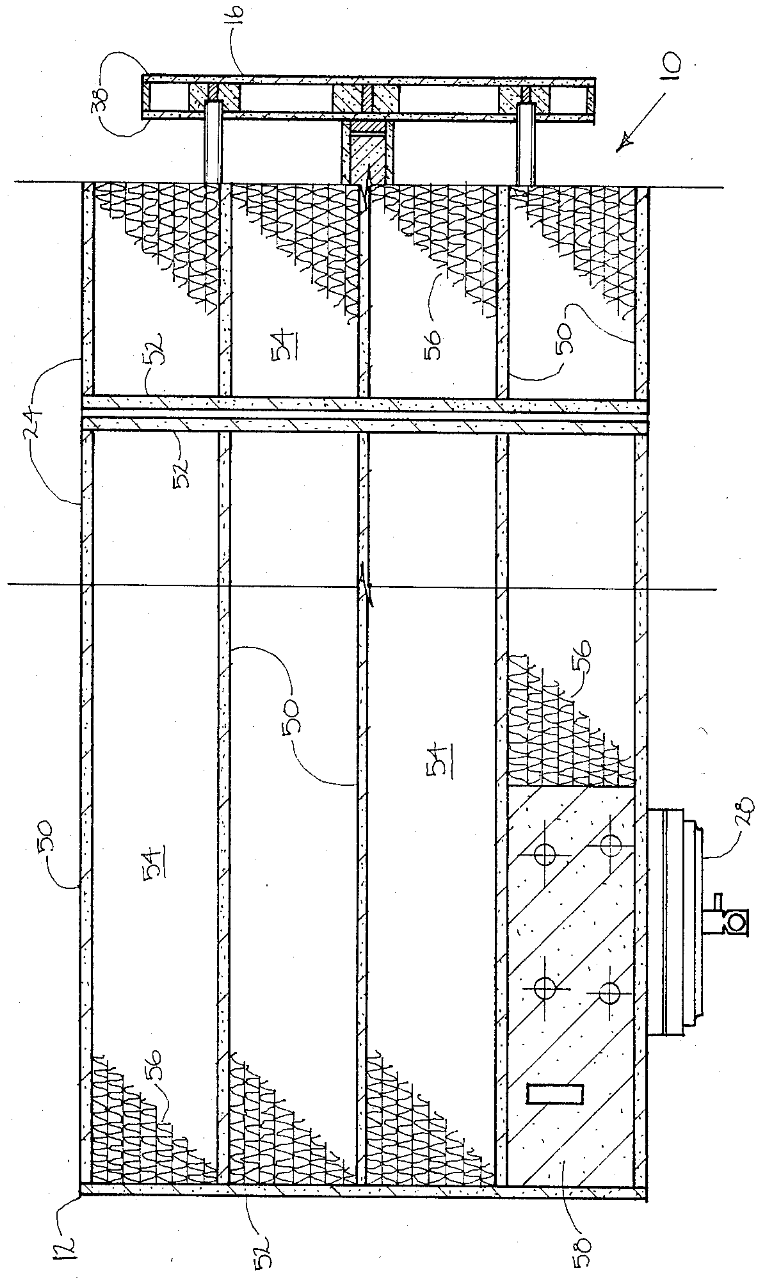
FIG. 4 is a top plan view of the bench and press of the present invention in section taken along Line 4—4 in FIG. 2.

The internal structure of legs 16 is illustrated in FIGS. 2, 3 and 4. Vertical leg ribs 32, leg top 34 and leg bottom 36, all of medium density fiberboard, are sandwiched between leg skins 38, also of medium density fiberboard. Fiberboard reinforcing blocks 40 are positioned to reinforce leg 16 where joined by caul supports 20, batten supports 22 and trestle 18. Leg top 34 is recessed below the upper edges of leg skins 38 and the outermost leg ribs 32 to form a pocket 42 (FIGS. 2 and 3) which receives a top mounting block 44 affixed to the underside of top 12 to join top 12 to the leg 16. Bolts 45 (FIG. 2) may be passed through leg skins 38 and top mounting block 44 to removably secure the top 12 to leg 16 joint.

As is best illustrated in FIGS. 2 and 4, trestle 18 joining legs 16 may be a box beam fabricated of medium density fiberboard with a fiberboard reinforcing block 17 recessed at each end of trestle 18 to form a trestle pocket 19. Pocket 19 may then capture a trestle block 21 affixed to the inner side of leg 16 to facilitate positioning of trestle 18 when joining it to leg 16. Suitable hardware, such as U-bolt 23 illustrated in FIG. 2 embedded in reinforcing block 17, may be used to removably join trestle 18 to leg 16.

Vice 28 is mounted at the left side of bench top 12 in the depicted enbodiment adjacent to a single conventional bench stop 30 to provide the traditional English woodworking bench configuration. The top cauls 24 are together shorter than bench top 12 to avoid interference by vice 28 with clamping in the press configuration further described below.

Bench top 12 and top caul 24 are substantially identical in construction, except for their length, to provide similar deformation characteristics under loading and thereby avoid bowing of one press member as typically would occur if press members were of different construction. Cauls 24 and top 12 are preferably assembled with glue in a high accuracy press able to exert uniform pressure to insure torsion box structures with upper and lower surfaces as flat as possible. As is best illustrated in FIGS. 2, 3 and 4, top 12 and caul 24 comprise torsion boxes having outer skins 46 of high density fiberboard to provide durable working surfaces, inner skins 48 of medium density fiberboard for additional strength and an internal structure comprising ribs 50 and end members 52 of medium density fiberboard which define cells 54 filled with resin impregnated paper honeycomb 56.

Specific materials which have been found to be suitable for practicing the present invention are MDF-44+4 medium density fiberboard available from Masonite Corporation, 29 N. Wacker Drive, Chicago, Ill. 60606; HDF-65 Temp. high density fiberboard, also available from Masonite Corporation; and $\frac{3}{8}$" 60-60-15 Verticel ® honeycomb paper core, a material having $\frac{3}{8}$" cell centers using 60 pound draft paper with 15% resin impregnation and 7.2 lineal inches of bonding per square inch, which is available from The Vertical Corporation, 4607 South Windermere, Englewood, Colo. 80110. These materials are assembled with an aliphatic resin adhesive available from Franklin Chemical Industries, 2020 Bruce Street, Columbus, Ohio 43207 under the trademark TITEBOND ®.

A solid insert 58 (shown in FIG. 4) of medium density fiberboard or other suitable material is provided where vice 28 and bench dog 30 are mounted to reinforce bench top 12, accept mounting hardware and to receive a pocket which may be necessary to accommodate mounting vice 28.

Battens 26 comprise multiple laminations alternating medium density fiberboard lamination 60 and high density fiberboard lamination 62. Importantly, battens 26 have a curved contact surface 64 to insure transmission of clamping pressure to the upper cauls 24 and lower caul (bench top) 12 when clamping pressure is applied to the ends of batten 26 by tightening conventional clamps 66.

As illustrated in FIG. 3, batten storage supports 22, may be two pipes or rods supported between legs 16 a distance below the underside of bench top 12 slightly greater than the height of battens 26 to provide out-of-the-way storage for battens 26 when not in use. So positioned, batten storage supports 22 also support batten 26 for clamping to facilitate use of the present invention by a single worker. Caul storage supports 20 may also be pipes or rods supported between legs 16 and located at any convenient height to provide out-of-the-way storage for top cauls 24 when not in use.

As is illustrated in FIGS. 1–3 and 5, pressing of a veneered panel 68 while the veneering glue is drying is achieved by placing the panel 68 on the upper surface of bench top 12 and then placing one of top cauls 24, or both cauls 24 if the panel 68 is larger than a single caul, on top of the panel. Waxed high density hardboard platens 70 may be inserted between panel 68 and cauls 24 and between panel 68 and top 12 to prevent excess glue from contacting the top or cauls. Alternatively, waxed paper or other suitable release film between the panel 68 and cauls 24 and top 12 may be use to serve the same purpose. Battens 26 are then positioned above top cauls 24 by resting battens 26 with their curved contact surfaces 64 down on top cauls 24, and below bench top 12 by resting battens 26 on batten storage supports 22 with their curved contact surfaces 64 up. Conventional clamps 66, which may be bar clamps, pipe clamps or other suitable clamping means able to span the distance between pairs of battens 26 are then placed at each end of each pair of battens 26. Clamping pressure is applied uniformly by alternatively tightening each clamp 66. Contact between contact surface 64 of the upper batten 26 of each pair of battens and top cauls 24 should be observed as pressure is applied. Pressure should be applied such that initial contact occurs at approximately the middle of each batten 26 and full pressure results in substantially simultaneous contact of each end of each batten 26 as the batten bends during application of pressure. This procedure will maximize uniformity of pressure along each batten 26.

Clamping of casegood carcases, not illustrated, is achieved in substantially the same way by substituting the carcass for veneered panel 68.

The foregoing description of the present invention is for purposes of explanation and illustration. It will be apparent to those skilled in the relevant art that modifications and changes of the invention as described may be made without departing from the scope and spirit thereof.

I claim:

1. A veneered panel and case goods assembly gluing press comprising:
   (a) at least two press cauls of torsion box structure constructed of outer torsion box skins of high density fiberboard, inner torsion box skins of medium density fiberboard and ribs and torsion box ends of medium density fiberboard; and
   (b) a plurality of pairs of battens having longitudinally curved contact surfaces for pressing the cauls together between members of each pair by exerting opposing pressure on the pairs of battens.

2. A woodworking bench comprising a means for supporting a bench top and a bench top having torsion box structure comprising outer torsion box skins of high density fiberboard, inner torsion box skins of medium density fiberboard, and ribs and torsion box ends of medium density fiberboard, the ribs, ends and inner skins forming cells containing resin impregnated paper corrugated honeycomb material.

3. A combination woodworking bench and gluing press comprising:
(a) a bench top of torsion box structure using fiberboard skins, ribs and torsion box ends,
(b) at least one removable press caul of torsion box structure substantially identical to the bench top torsion box structure,
(c) a plurality of pairs of press battens having longitudinally curved contact surfaces, and
(d) a stand for supporting the top, for storing the battens and caul when not in use and for supporting one of each of the pairs of battens when positioning battens during press use prior to application of pressure to the battens.

4. The bench and press according to claim 3 wherein said battens are formed of alternate laminations of medium density fiberboard and high density fiberboard.

5. The bench and press according to claim 3 wherein said stand comprises two legs of torsion box construction joined by a trestle and pairs of rods supported at the ends thereof by the legs to provide a means for supporting for the battens and press caul.

6. The bench and press according to claim 3 wherein each of said bench top and caul comprises a torsion box structure constructed of high density fiberboard outer skins, medium density fiberboard inner skins, and medium density fiberboard ribs and torsion box ends which, together with the inner skins, define cells filled with resin impregnated paper corrugated cellular filler material.

7. A combination woodworking bench and gluing press comprising:
(a) a bench top of torsion box structure constructed of high density fiberboard outer skins, medium density fiberboard inner skins, and medium density fiber board ribs and torsion box ends which, together with the inner skins, define cells filled with resin impregnated paper corrugated cellular filler material;
(b) at least one movable press caul of torsion box structure constructed of high density fiberboard outer skins, medium density fiberboard inner skins, and medium density fiberboard ribs and torsion box ends which, together with the inner skins, define cells filled with resin impregnated paper corrugated cellular filler materials;
(c) a plurality of pairs of press battens formed of alternate laminations of medium density fiberboard and high density fiberboard and having longitudinally curved contact surfaces; and
(d) a stand for supporting the top, for storing the battens and caul when not in use, and for supporting one of each of the pairs of battens when positioning battens during press use prior to application of pressure to the battens, said stand comprising two legs of torsion box construction joined by a box beam trestle and two pairs of horizontal rods supported at the ends thereof by the legs to provide a means for supporting the battens and press caul.

* * * * *